No. 733,360. PATENTED JULY 14, 1903.
J. D. AUSTIN.
APPARATUS FOR DESTROYING FLOATING VEGETATION.
APPLICATION FILED JAN. 2, 1903.
NO MODEL. 2 SHEETS—SHEET 1.
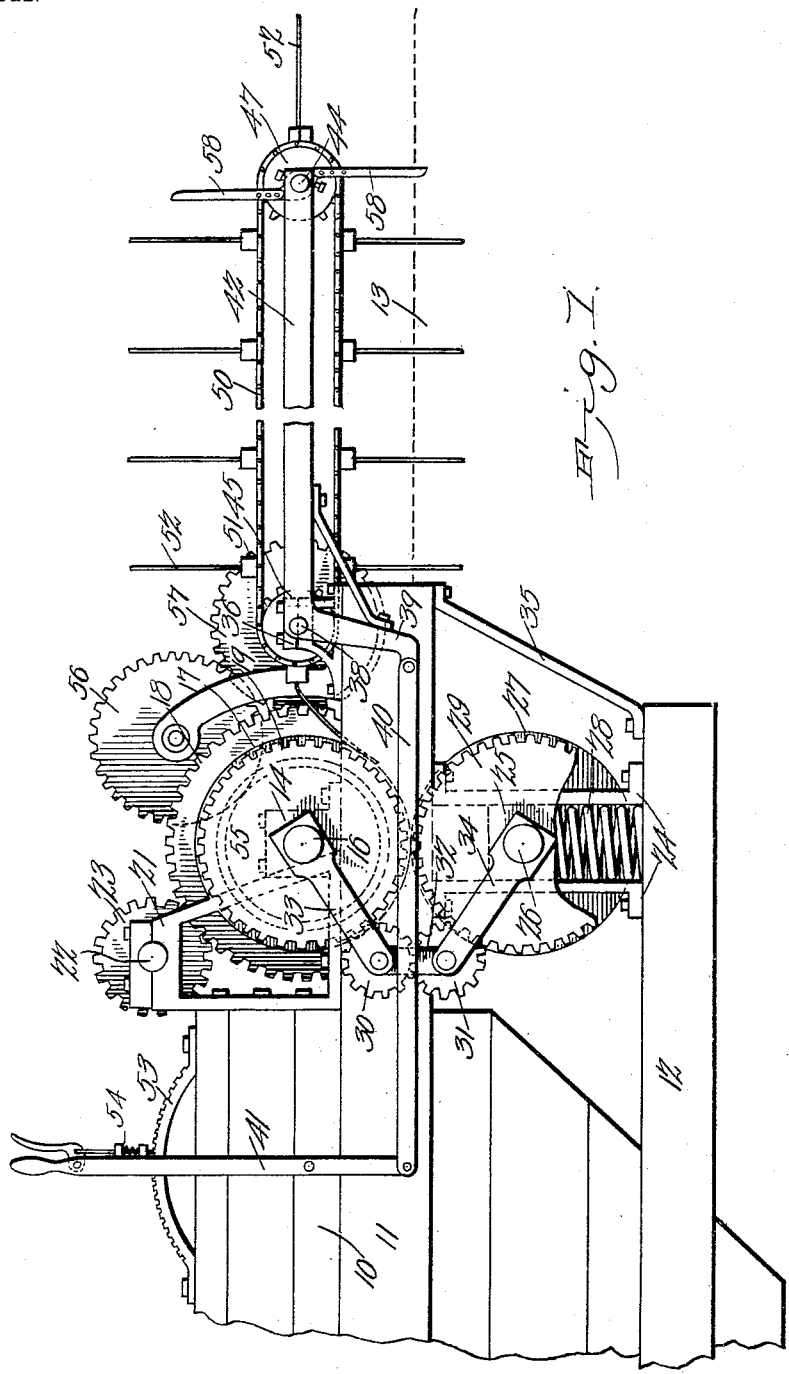
Witnesses
J. D. Austin, Inventor,
by C. A. Snow & Co.
Attorneys No. 733,360. PATENTED JULY 14, 1903.
J. D. AUSTIN.
APPARATUS FOR DESTROYING FLOATING VEGETATION.
APPLICATION FILED JAN. 2, 1903.
NO MODEL. 2 SHEETS—SHEET 2.
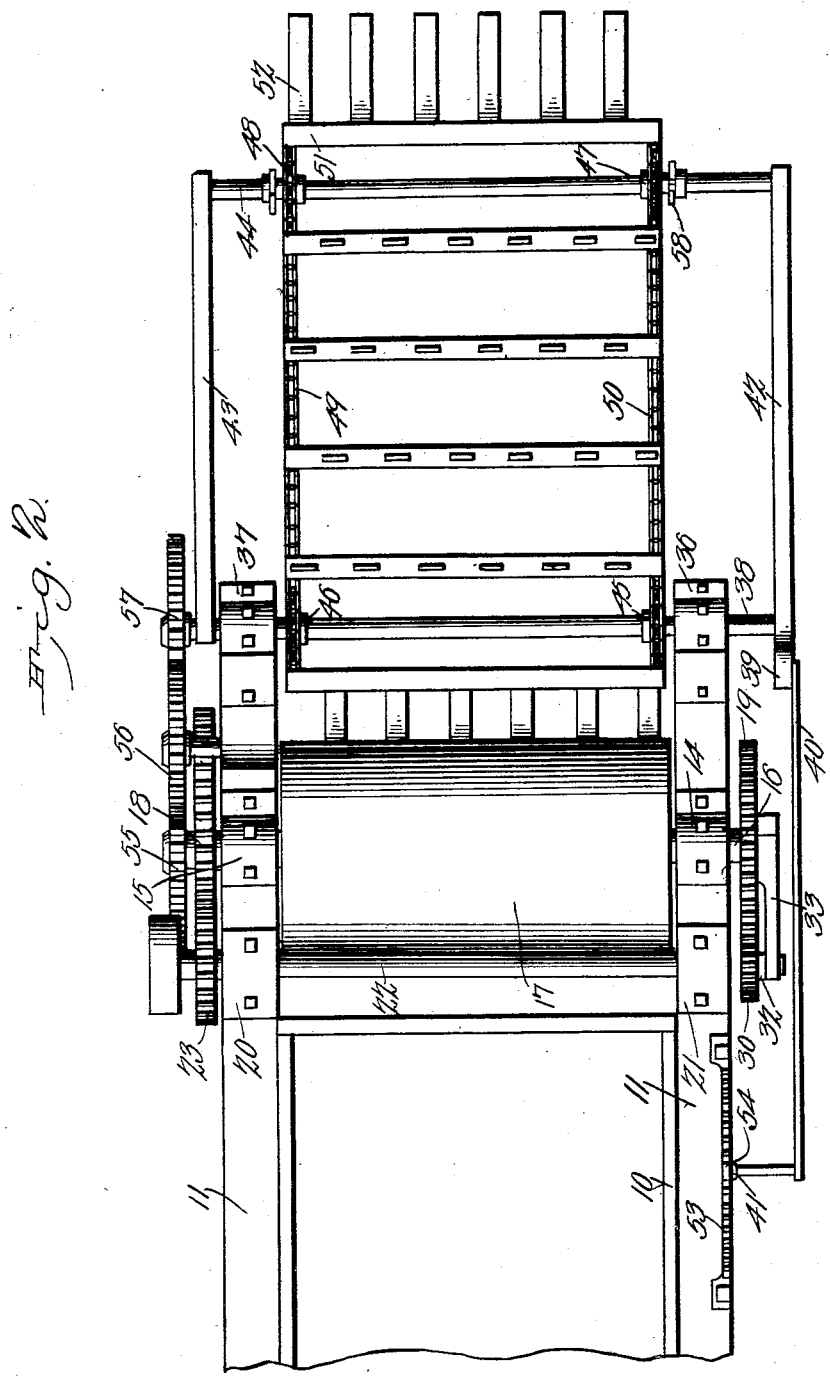

No. 733,360. Patented July 14, 1903.

UNITED STATES PATENT OFFICE.

JOHN D. AUSTIN, OF THONOTOSASSA, FLORIDA.

APPARATUS FOR DESTROYING FLOATING VEGETATION.

SPECIFICATION forming part of Letters Patent No. 733,360, dated July 14, 1903.

Application filed January 2, 1903. Serial No. 137,519. (No model.)

*To all whom it may concern:*

Be it known that I, JOHN D. AUSTIN, a citizen of the United States, residing at Thonotosassa, in the county of Hillsboro and State of Florida, have invented a new and useful Apparatus for Destroying Floating Vegetation, of which the following is a specification.

In many lakes, rivers, and other bodies of water navigation is seriously interfered with by the presence of rank growths of vegetation, especially in the Southern States, and much time and effort has been heretofore expended in attempts to remove or destroy this material, but so far without success, as the seed-germs are not destroyed by any of the means heretofore employed for removing such impediments.

This invention has for its object the destruction of such pernicious vegetation; and the invention consists in means operative to disintegrate or comminute the life germs or seeds thereof and either entirely destroy them or expose them to the action of elements which will destroy them and prevent further growth.

The invention further consists in certain novel features of construction, as hereinafter shown and described, and specified in the claims following.

My improved apparatus destroys the seed-germs of the plants, which germs are generally located below the surface of the water and are unaffected by poison sprayed on the tops thereof, so that further propagation is impossible and the river, lake, or other body of water permanently freed from vegetable growth after treatment by my apparatus.

The improved apparatus consists in a means whereby the growing vegetation is subjected to the action of disintegrating devices which act with sufficient force thereon to thoroughly dismember and destroy the seed-germs or expose the crushed particles to the action of or disintegrating influences in the air or water, and thus effectually prevent further growth.

Any suitable disintegrating means may be employed and arranged in any suitable manner; but preferably oppositely-rotating rollers will be employed for this purpose and connected with a suitable float or barge and with gathering and feeding mechanism to conduct the material to the disintegrating means, and for the purpose of illustration an approved arrangement of the operative mechanism thus arranged is shown.

Figure 1 represents a side elevation, and Fig. 2 a plan view, of a portion of a float or barge with the disintegrating and gathering mechanism connected thereto.

The improved apparatus may be attached to any suitable form of barge or vessel or floating supporting-frame and may be attached to a barge or vessel already constructed or to a structure made especially for the purpose.

In the drawings a portion of a conventional barge is indicated at 10 and provided with an extended framework for supporting the crushing and gathering means. This supporting-framework consists of spaced bars or arms 11 12 of suitable size and strength to support the weight of the apparatus, and will be so arranged relative to the barge that the frame will be partially immersed in the water, the upper surface of which is indicated at 13. The bars 11 12 will be arranged upon each side of the barge and in pairs in vertical alinement, as indicated. Rotatively mounted in bearings 14 15 upon the upper bars 11 is a transverse shaft 16, carrying a roller 17, the roller having a driving-gear 18 upon one end and a smaller gear 19 preferably upon the other end, as shown. The bearings 14 15 are extended upwardly to form bearings 21 20 for a transverse driving-shaft 22, the latter carrying a pinion 23, engaging the gear 18 on the roller-shaft 16. The shaft 22 will be driven from any suitable source of power, such as an engine or other suitable means upon the barge 10; but the engine or other source of power is not shown, as it forms no part of the present invention. Between each pair of the bars 11 12 are arranged spaced stay-bars 24, between which bearings 25 are slidably disposed, these bearings forming means for rotatively supporting the shaft 26 of the opposing roller 27. Between the bearings 25 and the lower bars 12 are arranged heavy tension-springs 28, which exert their force to maintain the roller 27 pressed forcibly against the roller 17, so that the lower roller will be held in yieldable relation to the upper roller, as will be obvious. The shaft 26 will be provided with a gear 29, corresponding to the gear 19 and connected thereto by interposed idler-pinions 30 31, the latter connected by a coupling-link 32 and the pinion 30 connected to the shaft 16 by a link-bar 33 and the pinion 31 connected to the shaft 26 by a similar link-bar 34, as shown. By this arrangement it will be obvious that the rollers 17 27 will be driven in opposite directions, as indicated by the arrows, and that at any movement of the yieldable roller 27 the link-bars 32, 33, and 34 will maintain the pinions 30 31 in constant operative position relative to the gears 19 29, and thus insure the proper continuous movement of the rollers irrespective of the position of the yieldable roller. By this means the rollers will both be positively operated at all times and the pressure will not be reduced by the adjustment of the yieldable roller. The bars 11 12 will be further suitably braced and supported by oblique braces 35.

It will be understood that a set of the idler-pinions and their connecting-links and the gears 19 29 may be employed upon each end of the rollers to increase the power and prevent unequal strains. The upper bars 11 will be extended beyond the roller 17 and will be provided with bearings 36 37, supporting a transverse shaft 38, the latter provided with an arm 39, from which a rod 40 leads to an operating-lever 41, by which means the shaft may be oscillated in its bearings. Attached to the shaft 38 are side bars 42 43, the bars connected at their free ends by a transverse shaft 44, as shown. Upon each of the shafts 38 44 are spaced chain-pulleys, (indicated at 45 46 47 48,) with which chains 49 50 are engaged, as shown. Connected across the chains at suitable intervals are bars 51, having yieldable teeth 52 attached thereto at suitable intervals. The teeth 52 will preferably be formed of flexible steel strips, and the shaft 38 will be so placed relative to the roller 17 and the teeth 52 of such length as to cause the teeth to come in contact with the roller as the belts are rotated in direction of the arrows and be bent thereby as they pass the roller, so that any adhering particles of material will be detached from the teeth. By this simple means the belts are self-clearing. By this arrangement a movable conveyer-belt is produced having spaced flexible teeth and operative above the water and with its lower side moving toward the rollers. By this arrangement also the toothed conveyer-belt may be adjusted by its attached end to raise or lower its free end to any desired extent, the lever 41 being arranged to be held at any desired point, as by a toothed segment 53 and spring-controlled pawl 54 of the ordinary construction.

The barge 10 or other supporting means will be "ballasted" to bring the dividing-line between the rollers substantially in alinement with the top of the water, as indicated by dotted line 13, and the apparatus will preferably be so constructed that their relative position will be uniformly maintained.

The endless toothed belt may be operated in any desired manner, such as by gears 55 56 57, from the shaft 16 or by any other suitable means.

The endless toothed belt may be of any required length and width, and the rollers 17 27 may be of any required length and diameter and the whole driven at any required speed to produce the desired results and to cause the material to be treated in the desired manner.

The barge 10 will be moved through the water by any suitable power, either by propelling means carried by the barge or the barge towed by tugs or other similar vessels or moved by any other suitable power, the propelling means depending largely upon the locality where employed or the conditions under which it is operated.

When thus constructed and arranged, the operation is as follows: The barge will be moved to the part of the body of water containing the vegetation which it is desired to destroy and the endless belt projected over the material to be treated with the teeth 52 in contact therewith and projecting beneath the surface of the water, as indicated, so that when the belt is operated the floating material will be carried against the rollers 17 27 and by them crushed into a shapeless mass and discharged in that condition into the water again between the bow of the barge and the rollers. By this simple means as the barge moves forward the floating vegetable matter will be gathered by the moving toothed belt and fed to the rollers and by them thoroughly crushed and the life-germs disintegrated and either at once destroyed or exposed to the action of the water or air, which complete the destruction and effectually prevent further growth. The most pernicious and refractory plant life is thus utterly destroyed and prevented from effecting further mischief or interfering with navigation.

The barge may be moved through the channel or into all parts of the body of the water until every floating plant is acted upon, and any body of water, no matter what the size, may thus be permanently and quickly cleared from deleterious growths of all kinds.

Suitable cutting means may be connected to the device and operated in any suitable manner to sever the vegetable matter when the growth is matted or intertwined to such an extent that the fingers 52 will not gather it and feed it to the crushing means, and an approved form of such cutting means is shown, consisting in cutting-blades 58, extending from the shaft 44 and adapted to operate at the sides of the forward end of the gathering-belt, as shown. By this means the floating material will be severed in advance of the gathering-belt, so that the belt will gather the material only directly in the line of travel of the barge and will not draw the material which lies outside the line of travel. At the next trip the barge will be caused to gather the material which has been passed during prior trips, and so on over the whole expanse of the water until all has been gathered. By this means all the floating or buoyant growing material will be systematically gathered and treated.

The apparatus thus constructed and operated will be found especially advantageous in removing wild hyacinth, wild lettuce, water-lilies, and similar growth from rivers and lakes, especially in the southern portion of the country, and rivers and other bodies of water which have been practically unnavigable heretofore for this reason may by this means be entirely cleared from such obstructions at the expenditure of a small amount of labor and at comparatively small expense.

The apparatus will be found thus especially advantageous for destroying the life-germs of vegetable matter wherein the seed germs or pods are near the surface of the water, as this device gathers the plant material which rests upon or near the surface of the water, and thus effectually reaches this class of material, which has heretofore baffled all efforts aimed at its destruction.

The disintegrating means may be located upon the deck of the barge and the material to be treated conducted thereto by suitable gathering and elevating devices and the disintegrated material either returned to the water or conveyed to any other desired locality; but such an arrangement would not be a departure from the principle of the invention, as the same results would be accomplished in substantially the same manner.

While the means herein disclosed is the preferable one for accomplishing the desired ends, any suitable means may be substituted for gathering and disintegrating the material, and the parts may be modified and changed in minor particulars without departing from the principle of the invention or sacrificing any of its advantages, and I hereby reserve the right to such modifications and alterations as may fall within the scope of the claims.

Having thus described my invention, what I claim is—

1. An apparatus mounted to float on the surface of the water carrying crushing-rolls and provided with means for extending into the water below its surface and engaging the floating vegetation and feeding it between said rolls.

2. An apparatus for destroying vegetation growing in and floating on the water, comprising a supporting-float having comminuting means mounted thereon, and means disposed in front of said comminuting means and arranged to extend into the water below its surface to engage the vegetation and feed it to said comminuting means.

3. In a device of the class described, comminuting means mounted to float on the water, means for longitudinally dividing the material to be treated, and means for gathering the divided material and feeding it to the comminuting means.

4. In an apparatus of the class described, a floating support movable upon the water, a frame extending from said support in a plane parallel with and above the surface of the water, comminuting means carried by said frame, and an endless belt having fingers of a length sufficient to extend below the surface of the water to gather and feed vegetation to said comminuting means, said belt being supported in said frame and running in planes parallel with and above and below it.

5. In an apparatus of the class described, opposing crushing-rollers rotatively disposed, and an endless belt having spaced flexible fingers and operative adjacent to said rollers, and the flexible fingers caused to consecutively engage said rollers and be deflected thereby to remove adhering material.

In testimony that I claim the foregoing as my own I have hereto affixed my signature in the presence of two witnesses.

JOHN D. AUSTIN.

Witnesses:
JOHN B. WALTON,
D. B. GIVENS.